INVENTOR.
Harold L. Wheaton
Thomas H. Bishop
ATTORNEYS

United States Patent Office 3,723,097
Patented Mar. 27, 1973

3,723,097
METHOD OF PREVENTING DROSS FORMATION DURING REMELTING
Harold L. Wheaton, Kensington, and Thomas H. Bishop, Alliance, Ohio, assignors to TRW Inc., Cleveland, Ohio
Filed Jan. 18, 1971, Ser. No. 107,110
Int. Cl. C22d 7/06
U.S. Cl. 75—10 V                                    7 Claims

ABSTRACT OF THE DISCLOSURE

Method of mimimizing dross formation during vacuum remelting of a nickel base or cobalt base alloy which is normally reactive with oxygen, by applying a metallic barrier layer about a charge of the alloy, the barrier layer being composed of a metal having a substantially lower affinity for oxygen than the reactive metals in the alloy, and melting the charge under vacuum conditions.

BACKGROUND OF THE INVENTION

Field of the invention

This invention is in the field of melting high temperature alloys which have reactive metals in the composition tending to oxidize even under relatively low partial pressures of oxygen by covering the surface of such alloys with a thin barrier layer of a less reactive metal before melting.

DESCRIPTION OF THE PRIOR ART

It is common practice in foundries dealing with investment casting processes to prepare master heats of nickel-base or cobalt-base superalloys by vacuum induction melting, and then casting the resulting deoxidized melts into ingot bars. The ingot bars are subsequently vacuum induction remelted in porous refractory oxide crucibles or liners composed of non-reactive oxides such as alumina, zircon, zirconia, mullite or the like. Vacuum melting is employed in preference to other types of melting for a number of reasons. For one, the amount of dissolved gases in the metal is held to a very low level. The alloys are further purified through volatilization of low melting point elements such as lead, bismuth, tin and the like. The vacuum melting permits the use of carbon deoxidation for refining. The products of carbon deoxidation are volatile and may be pumped from the melting furnace, so that metals can be refined without the use of a slag, and thus produce fewer inclusions. Additionally reactive alloying elements such as aluminum, titanium, zirconium and the like can be added to the melt without oxidizing as they would in air melting. Finally, vacuum melted metals frequently have improved mechanical properties.

The refractory bodies in which the metals are remelted contain appreciable quantities of oxygen because of their porosity and high surface area. In melting furnaces employing disposable refractory liners, where a new refractory liner is used for each heat, the rate of outgassing is slow even under high vacuum conditions. This rate increases as heat is applied from the induction heating field, but the solid charge reacts with the oxygen given off by the liner once it reaches oxidizable temperatures. This is due to the fact that most nickel and cobalt base alloys contain appreciable quantities of reactive elements such as aluminum and titanium which cause them to be oxidized even at low partial pressures of oxygen. The resulting oxide film floats on the surface of the bath as melting proceeds, and the resulting dross must be removed by costly procedures, not always entirely effective, to prevent the presence of inclusions in the resulting castings.

SUMMARY OF THE INVENTION

It has now been found that the amount of dross produced during remelting can be substantially reduced by incorporating a thin barrier layer on the ingot charges fed to the melting furnace. Specially, we have found that a nickel or cobalt coating, which need not be more than about 0.010 inch in thickness provides a marked reduction in the number of inclusions and consequently a substantial decrease in the amount of material that has to be scrapped. The coating can be applied in any of a variety of processes, such as electroplating, thermal decomposition of volatilized nickel or cobalt compounds, or by wrapping in a thin sheet of metallic foil.

BRIEF DESCRIPTION OF THE DRAWING

Other objects, features and advantages of the invention will be readily apparent from the following description of a preferred embodiment thereof, taken in conjunction with the accompanying drawing, although variations and modifications may be effected without departing from the spirit and scope of the novel concepts of the disclosure, and in which.

DESCRIPTION OF THE PREFERRED EMBODIMENTS

Figure 1:
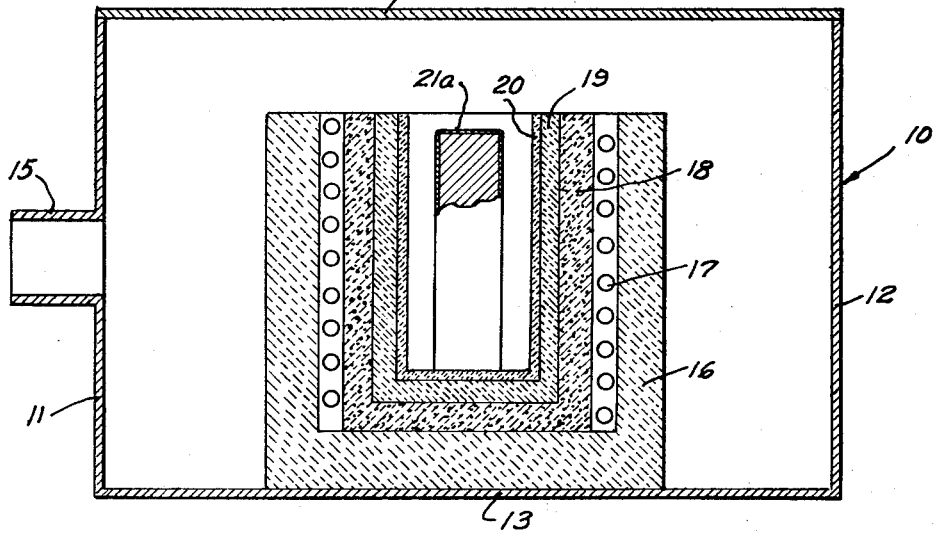
FIG. 1 is a cross-sectional view of a vacuum induction melting furnace utilizing the improvements of the present invention.

In FIG. 1, reference numeral 10 indicates generally a furnace for remelting ingot charges, the furnace 10 including metal walls 11 and 12, and a floor 13, together with a removable top wall 14 providing an airtight enclosure. A fitting 15 is provided to communicate the interior of the furnace 10 with a suitable source of vacuum (not shown).

Disposed within the furnace 10 is a remelting furnace composed of a refractory frame 16. An induction coil 16 is located between the frame 16 and a layer 18 of granular refractory backup material. A refractory backup crucible 19 is disposed in the granular refractory backup layer 18, and a disposable refractory liner 20 fits inside the backup crucible 19.

An ingot 21 of cylindrical configuration is shown disposed of remelting furnace, and protected against surface oxidation by being wrapped in a thin layer of foil 21a measuring about 0.001 inch in thickness. In the case of nickel-base superalloys, it is preferable to employ a nickel barrier layer so as not to alter the composition of the alloy significantly when the charge is melted and dissolves the protected layer.

The process of the present invention is applicable to the melting of any type of high temperature alloy, but finds particular utility in the melting of the nickel base and cobalt base superalloys. While chemistry of these alloys is not of the essence of the invention, the following tables list representative members of each class of alloy:

Ni Base Alloys

| Element: | "B-1900" | "IN 100" | "MAR-M200" |
|---|---|---|---|
| C | 0.10 | 0.18 | 0.15 |
| Cr | 8.0 | 10.0 | 9.0 |
| Co | 10.0 | 15.0 | 10.0 |
| Mo | 6.0 | 3.0 | |
| W | | | 12.5 |
| Cb | | | 1.0 |
| Ti | 1.0 | 4.7 | 2.0 |
| Al | 6.0 | 5.5 | 5.0 |
| B | 0.015 | 0.014 | 0.015 |
| Zr | 0.10 | 0.06 | 0.05 |
| Ta | 4.0 | | |
| V | | 1.0 | |
| Ni | Balance | Balance | Balance |

Co Base Alloys

| Element: | "MAR-M302" | "MAR-M322" |
|---|---|---|
| C | 0.85 | 1.0 |
| Mn | | 0.20 |
| Si | | |
| Cr | 21.5 | 21.5 |
| Ni | | |
| W | | 9.0 |
| B | 0.005 | |
| Zr | 0.20 | 2.2 |
| Ta | 9.0 | 4.5 |
| Fe | | 1.5 |
| Ti | | 0.75 |
| Co | Balance | Balance |

Instead of a foil wrapping, the ingot may have a thin electroplated or thermally deposited coating completely covering all exposed surface area of the ingot to be melted. This procedure is also effective in reducing dross formation, but is somewhat more expensive than the simple expedient of wrapping the charges in a thin sheet of foil.

EXAMPLE 1

An evaluation was made on 96 castings of a nickel-base super-alloy prepared by vacuum induction remelting 12 charges of 3¼" ingot bar and pouring said remelts into investment molds prepared by the lost wax process. The ingots were ground to remove any tenacious surface oxides. Some of these ingots were given a single wrap of commercial purity nickel foil containing 99.0 minimum percent nickel. The foil was 0.001 inch thick and was in the soft, fully annealed condition. The charges were given a single wrap with an overlap of a few inches. The length of the foil was sufficient to allow approximately 2 inches of overlap at the ends of the ingot. The overlaps were folded over to enclose the ends of the ingot charge.

The 96 castings were divided into 4 groups with each group representing three 8-piece clusters. The first group had been wrapped in nickel foil and heated to a superheat temperature of 3000° F., some 300° above the pouring temperature of the alloy for the particular casting being made. The second group of ingots was superheated to 3000° F. in the melting furnace but the ingots were not wrapped. The third group of samples was wrapped with the nickel foil, but the heating in the furnace was merely to the pouring temperature, with no superheat. The fourth group of samples was not wrapped in foil and melted without superheating.

The samples after casting were examined for inclusions by the "Zyglo" process which is a nondestructive testing procedure well known to those skilled in the art. Briefly, it involves a fluorescent dye penetrant over the surface of the article to be tested, removing excess penetrant, and then applying a developer which helps to extract any penetrant lodged in surface discontinuities, and hold it at the surface where it can be inspected under black light.

Figure 2:
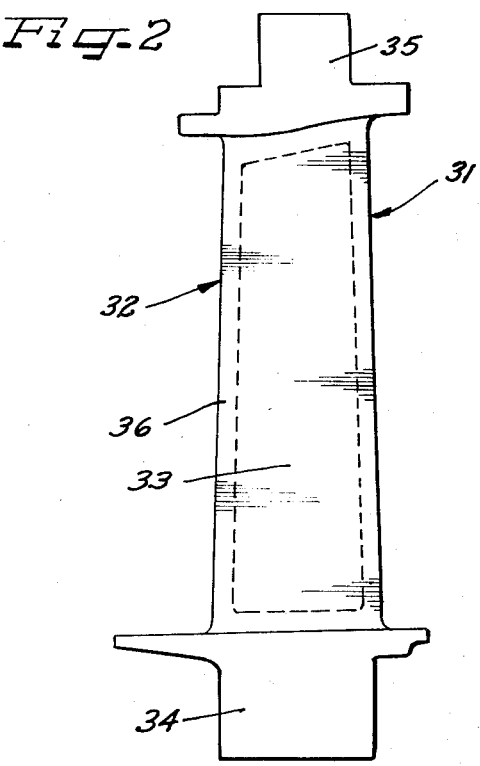
FIG. 2 is a view of a cast turbine blade in elevation illustrating the various portions which were checked to evaluate the results of the present invention.

In FIG. 2, there is shown a turbine blade of standard design for the purpose of illustrating how the "Zyglo" testing was done. The trailing and leading edges of the airfoil casting are indicated at reference numerals 31 and 32, respectively. An airfoil section 33 extends between a root portion 34 and a shroud portion 35. A band approximately ⅛ inch in depth interiorly of the leading and trailing edges 31 and 32 has been marked as reference numeral 36.

In order for a casting to be acceptable, no "Zyglo" indications are allowed in the area designated at 36. Up to 6 "Zyglo" indications are permitted in areas 33 and 35 provided they are less than 1/32 inch in size and are spaced by a minimum distance of ⅛ inch.

The following table summarizes the results obtained from the standpoint of the amount of dross at melt down, and the percentage yield of acceptable castings in each group:

| | Processing | Percent Dross on surface of melt after melt down | Yield |
|---|---|---|---|
| 1. Superheated | Wrapped | <10 | 55 |
| 2. Superheated | Unwrapped | 100 | 39 |
| 3. No superheat | Wrapped | <10 | 26 |
| 4. No superheat | Unwrapped | 100 | 5 |

As will be seen in the foregoing table, the surface of the melts prepared from ingots which had not been wrapped are completely covered with dross at melt down. However, the heats prepared by remelting charges wrapped in nickel foil showed less than 10% dross at melt down. The yield of acceptable castings is thus significantly improved by the use of the protective barrier layer. The best results are obtained when the metal is superheated as well as being wrapped. This is due to the fact that the nickel wrapping technique minimizes dross coverage, at melt down and the superheating operation removes a portion of the remaining dross.

EXAMPLE 2

Three nickel-base alloy charges were ground and electroplated with nickel. The resulting nickel electroplate was a few tenths of a mil thick. The coated ingots, along with two uncoated ingots, were subsequently vacuum induction remelted in a disposable refractory liner and castings were poured. No superheating operation was performed on the melts. The castings were Zygloed and rated by the method described in Example 1, and the results are shown below.

| Processing | Percent Dross on surface of melt after melt down | Yield |
|---|---|---|
| Ni plated | <10 | 42 |
| Standard—no nickel plate | 100 | 12 |

The foregoing table indicates a marked reduction in the amount of dross at melt down and a substantial improvement in yield of acceptable products which can be achieved through the process of the present invention.

We claim as our invention:

1. The method of minimizing dross formation during the vacuum induction melting of a charge of nickel or cobalt base alloy containing alloying ingredients which are more reactive toward oxygen than the base metal, said melting being carried out in a porous refractory oxide crucible, said alloying ingredients tending to oxidize during melting and form a supernatant dross which comprises providing a metallic barrier layer completely about said charge, said barrier layer having a substantially lower affinity for oxygen than said alloying ingredients, and melting said charge in said crucible under vacuum conditions.

2. The method of claim 1 in which said alloy is a nickel base alloy and said barrier layer is composed of metallic nickel.

3. The method of claim 1 in which said alloy is a cobalt base alloy and said barrier layer is composed of metallic cobalt.

4. The method of claim 1 in which said barrier layer consists of a thin sheet of nickel foil wrapped around said charge.

5. The method of claim 1 in which said barrier layer consists of an electroplated nickel layer.

6. The method of claim 1 in which said barrier layer consists of a thin sheet of cobalt foil wrapped around said charge.

7. The method of claim 1 in which said barrier layer consists of an electroplated cobalt layer.

References Cited
UNITED STATES PATENTS

| | | | |
|---|---|---|---|
| 3,529,958 | 9/1970 | Buehler | 164—51 UX |
| Re. 26,042 | 6/1966 | Grebe et al. | 75—65 R |

WINSTON A. DOUGLAS, Primary Examiner

M. J. ANDREWS, Assistant Examiner

U.S. Cl. X.R.

75—65, 96; 204—37